(12) United States Patent
Strickland et al.

(10) Patent No.: US 12,017,259 B2
(45) Date of Patent: Jun. 25, 2024

(54) EXTRAPLANETARY TOOL CLEANER

(71) Applicant: Hamilton Sundstrand Corporation, Charlotte, NC (US)

(72) Inventors: Julie Strickland, Houston, TX (US); Jake Rohrig, Simsbury, CT (US); Daniel Kaplan, Melbourne Beach, FL (US); Ashley Rose Himmelmann, Beloit, WI (US); Samuel Anderson, Houston, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/544,055

(22) Filed: Dec. 7, 2021

(65) Prior Publication Data

US 2023/0173560 A1 Jun. 8, 2023

(51) Int. Cl.
*B08B 7/04* (2006.01)
*B08B 3/02* (2006.01)
*B08B 3/12* (2006.01)
*B08B 3/14* (2006.01)
*B08B 7/02* (2006.01)
(Continued)

(52) U.S. Cl.
CPC .................. *B08B 7/04* (2013.01); *B08B 3/02* (2013.01); *B08B 3/12* (2013.01); *B08B 3/14* (2013.01); *B08B 7/028* (2013.01); *B08B 15/02* (2013.01); *B64G 4/00* (2013.01); *B08B 2203/00* (2013.01); *B08B 2215/00* (2013.01)

(58) Field of Classification Search
CPC ...................................................... B08B 7/04
See application file for complete search history.

(56) References Cited

U.S. PATENT DOCUMENTS

| 4,655,235 A | 4/1987 | Scott, Jr. |
| 4,850,380 A | 7/1989 | Koslow |
| 2004/0055067 A1 | 3/2004 | Boettcher et al. |

(Continued)

FOREIGN PATENT DOCUMENTS

| CN | 2908355 Y | * | 6/2007 |
| CN | 109747866 A | * | 5/2019 |

(Continued)

OTHER PUBLICATIONS

Liu, CN-2908355-Y, English machine translation (Year: 2007).*

(Continued)

*Primary Examiner* — Jason Y Ko
(74) *Attorney, Agent, or Firm* — CANTOR COLBURN LLP

(57) ABSTRACT

An equipment cleaning apparatus for an extraplanetary environment includes a cleaner vessel positioned at an exterior of an extraplanetary habitat, and an exterior hatch located outside of the extraplanetary habitat and allowing access to an interior of the cleaner vessel. The cleaning apparatus is operable in one or more cleaning cycles to clean equipment located in the cleaner vessel. A method of cleaning equipment in an extraplanetary environment includes providing a cleaner vessel at an extraplanetary habitat, placing one or more articles of equipment into an interior of the cleaner vessel through an exterior hatch located outside of the extraplanetary habitat, closing the exterior hatch, and operating one or more cleaning cycles on the equipment in the cleaner vessel.

11 Claims, 2 Drawing Sheets

(51) Int. Cl.
   *B08B 15/02* (2006.01)
   *B64G 4/00* (2006.01)

(56) References Cited

U.S. PATENT DOCUMENTS

2021/0069635 A1  3/2021  Skomurski et al.
2021/0308313 A1  10/2021  Moser et al.

FOREIGN PATENT DOCUMENTS

EP    3978374 A1  4/2022
GB    2467309 A   8/2010

OTHER PUBLICATIONS

Huang, CN-109747866-A, English machine translation (Year: 2019).*
Agui Juan, et al.; NASA Lunar Dust Filtration and Separations Workshop Report; Dec. 1, 2009; pp. 1-35; XP055885554, Retrieved from the Internet: URL: https://ntrs.nasa.gov/api/citations/20100004823/downloads/201000048236.pdf.
European Search Report for European Applicaiton No. 22208622.5; dated Apr. 17, 2023; 111 pages.

* cited by examiner

EXTRAPLANETARY TOOL CLEANER

BACKGROUND

Exemplary embodiments pertain to the art of extraplanetary habitation, and more particularly to usage and cleaning of tools used in an extraplanetary environment.

Extraplanetary, for example, lunar, exploration and habitation involves the use of tools and other equipment outside of an extraplanetary habitat. Such tools are typically stored inside the habitat, and require periodic inspection and cleaning. Lunar dust, for example, is pervasive and includes charged ions, and the dust can easily be tracked or carried into a habitat, lander or rover space after the tools are used on the lunar surface. Without effective containment of the dust and cleaning of the tools, personnel can be exposed to the dust, which results in health issues such as scar tissue on the lungs. Tools must be cleaned in order to inspect them for damage and to maintain them.

BRIEF DESCRIPTION

In one embodiment, an equipment cleaning apparatus for an extraplanetary environment includes a cleaner vessel positioned at an exterior of an extraplanetary habitat, and an exterior hatch located outside of the extraplanetary habitat and allowing access to an interior of the cleaner vessel. The cleaning apparatus is operable in one or more cleaning cycles to clean equipment located in the cleaner vessel.

Additionally or alternatively, in this or other embodiments the cleaner vessel is operably connected to a habitat pressurization and depressurization system to selectably pressurize the cleaner vessel.

Additionally or alternatively, in this or other embodiments a drain returns fluid utilized in the cleaning vessel to a fluid reclamation system of the extraplanetary habitat.

Additionally or alternatively, in this or other embodiments a filtering mechanism is positioned at the drain.

Additionally or alternatively, in this or other embodiments an interior hatch is located inside of the extraplanetary habitat and allows access to the interior of the cleaner vessel from inside the extraplanetary habitat.

Additionally or alternatively, in this or other embodiments the exterior hatch is openable only when the interior hatch is closed, and the interior hatch is openable only when the exterior hatch is closed.

Additionally or alternatively, in this or other embodiments the one or more cleaning cycles includes one or more of a fluid cleaning cycle, an air cleaning cycle, an ionic shower cleaning cycle, an ultrasonic cleaning cycle, or a centrifugal force cleaning cycle.

Additionally or alternatively, in this or other embodiments a dump tank collects waste from the cleaning vessel.

Additionally or alternatively, in this or other embodiments the contents of the dump tank are periodically tested for the presence of volatile materials.

Additionally or alternatively, in this or other embodiments upon detection of the presence of volatile materials, the dump tank is emptied outside of the habitat.

Additionally or alternatively, in this or other embodiments one or more charging features are located in the cleaner vessel for charging the equipment disposed in the cleaner vessel.

In another embodiment, a method of cleaning equipment in an extraplanetary environment includes providing a cleaner vessel at an extraplanetary habitat, placing one or more articles of equipment into an interior of the cleaner vessel through an exterior hatch located outside of the extraplanetary habitat, closing the exterior hatch, and operating one or more cleaning cycles on the equipment in the cleaner vessel.

Additionally or alternatively, in this or other embodiments the cleaner vessel is selectably pressurized via an operable connection of the cleaner vessel to a habitat pressurization and depressurization system.

Additionally or alternatively, in this or other embodiments fluid utilized in the cleaning vessel is returned to a fluid reclamation system of the extraplanetary habitat.

Additionally or alternatively, in this or other embodiments the fluid is filtered.

Additionally or alternatively, in this or other embodiments an interior hatch of the cleaner vessel located inside of the extraplanetary habitat is opened to allow access to the interior of the cleaner vessel from inside the extraplanetary habitat.

Additionally or alternatively, in this or other embodiments the exterior hatch is openable only when the interior hatch is closed, and the interior hatch is openable only when the exterior hatch is closed.

Additionally or alternatively, in this or other embodiments the one or more cleaning cycles includes one or more of a fluid cleaning cycle, an air cleaning cycle, an ionic shower cleaning cycle, an ultrasonic cleaning cycle, or a centrifugal force cleaning cycle.

Additionally or alternatively, in this or other embodiments waste from the cleaning vessel is collected at a dump tank.

Additionally or alternatively, in this or other embodiments the contents of the dump tank are periodically tested for the presence of volatile materials.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
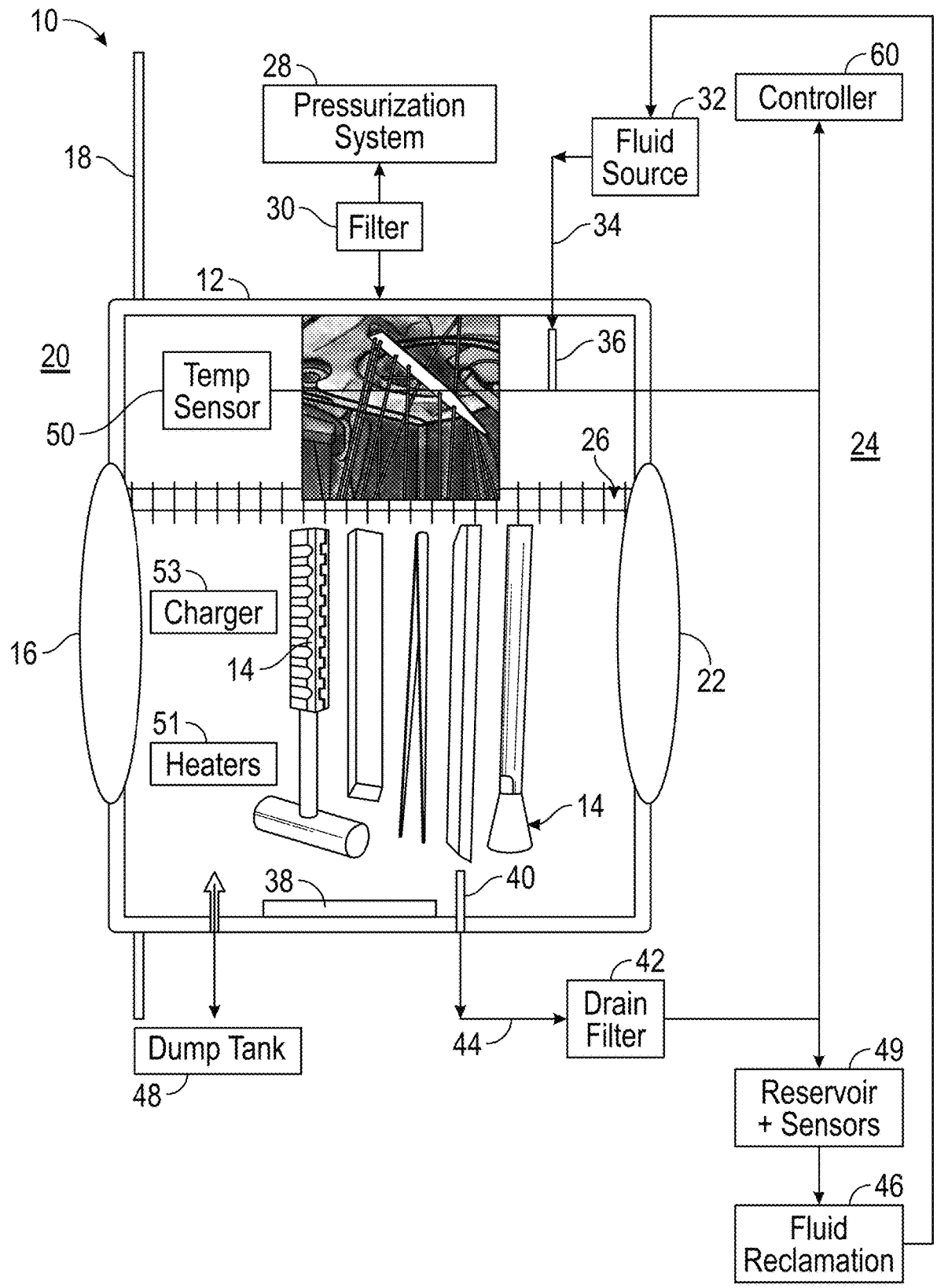
FIG. 1 is a schematic illustration of embodiment of an equipment cleaning system for use on an extraplanetary environment.

Referring to FIG. 1, illustrated is an exemplary embodiment of an extraplanetary equipment cleaner and storage vessel 10. The cleaner 10 includes a cleaner vessel 12 into which equipment, schematically illustrated at 14, is inserted via an exterior hatch 16. Equipment 14 may include tools, clothing and other items utilized by personnel in the extraplanetary environment. In some embodiments, the cleaner 10 may be affixed within, for example, an exterior habitat wall 18 that separates the exterior 20 from the interior (i.e., the habitat 24) or, alternatively, to a rover or a lander. The exterior hatch 16 is accessible from the exterior 20 of the habitat wall 18 such that the equipment 14 is inserted into the cleaner vessel 12 without the personnel entering into the habitat 24 to do so. In some embodiments, the cleaner vessel 12 may include an interior hatch 22 located in the habitat 24. The interior hatch 22 allows for access to the cleaner vessel 12 from within the habitat 24 such that, for example, after operation of the cleaner 10, clean equipment may be removed from the cleaner vessel 12 for storage elsewhere, or for inspection and/or repair of the equipment 14. The exterior hatch 16 is locked in a closed position when the interior hatch 22 is open or when the cleaner 10 is operating. Similarly, the interior hatch 22 is locked in a closed position when the exterior hatch 16 is open and when the cleaner 10 is operating.

The cleaner vessel 12 includes one or more racks 26, including hangers, clamps or magnetic strips to secure the equipment 14 in place inside the cleaning vessel 12. Further, the racks 26 may be movable or slidable or otherwise adjustable in position inside the cleaner vessel 12. Additionally, charging features 53 may be located in the cleaner vessel 12 to allow for charging of the equipment 114 while in the cleaner vessel. The cleaner vessel 12 is connected to a habitat pressurization and depressurization system 28 to selectably pressurize the cleaner vessel 12 before, for example, the interior hatch 22 is opened or when the cleaner 10 is operated, or depressurized prior to the exterior hatch 16 being opened. One or more filters 30 are located at the pressurization and depressurization system 28 to filter any airborne dust or other particulates from the cleaner vessel 12 to prevent such particles from contaminating the habitat outside of the cleaner vessel 12.

The cleaner 10 cleans the equipment 14 in a main cleaning cycle via a fluid, for example, water or another liquid fluid, provided into the interior of the cleaner vessel 12 from a fluid source 32, such as a storage tank. In some embodiments, the fluid source 32 may include a tank that contains solid matter (e.g., ice) added to the vessel 12 as needed to regulate temperature. The fluid loop may be closed and not draw fluid from the habitat 24 but rather a soap mixture from the fluid source 32, for example.

The fluid 34 is admitted into the cleaner vessel 12 through, for example, one or more spray nozzles 36. In some embodiments, along with or in place of the fluid 34, a cleaning solution or other fluid may be utilized to clean the equipment 14. Additionally, the cleaner 10 may utilize an ionic shower via a charged plate 38 located in the cleaner vessel 12 to pull dust from the equipment 14 as a pre-cycle prior to the fluid wash, and/or an ambient atmosphere blow off of the equipment 14 to remove an initial portion of the dust from the equipment 14. Further still, the cleaner 10 may also use secondary cleaning cycles, such as an ultrasonic vibration cleaning cycle, or centrifugal force to remove dust and particles from the equipment 14 during the cleaning operation.

In some embodiments, the vessel 12 has a mechanism to raise/lower temperature for material phase change cleaning effects and/or to facilitate cleaning. A temperature sensor 50 is utilized to measure an internal temperature of the cleaner vessel 12 and inform the system. One or more heaters 51 could warm the cleaner vessel 12 as needed to maintain a selected temperature inside the vessel 12. In instances where cooling of the interior of the vessel 12 is needed, cold air from the habitat's 24 air conditioning loop. For example, in an environment that has an ambient temperature below freezing, heating the fluid may be required to keep it in a liquid state. Likewise, in a hot environment, cooling may be necessary to keep the fluid from becoming a gas.

The cleaner vessel 12 includes a drain 40 through which the fluid 34 and accumulated dust from the cleaning cycle are removed from the cleaner vessel 12. One or more drain filters 42 are located along a drain line 44 connecting the drain to a recycling system which filters and reuses the fluid one or more times prior to sending the fluid to a Water Processor Assembly (WPA) or fluid reclamation system 46. Waste from the cleaning vessel 12 other than fluid 34 is removed from the cleaning vessel 12 to a dump tank 48. The waste material in the dump tank 48 is periodically tested for the presence of volatiles by, for example, hyperspectral imaging, and the contents of the dump tank 48 may be evacuated to the surface should volatile materials be detected, or if the dump tank 48 is full.

After the drain filter 42, the fluid may be diverted back to the fluid source 32 to reduce the total amount of fluid used. A reservoir 49 downstream of the drain filter 42 contains sensors to ensure that the fluid is clean prior to diverting it to the main fluid source 32. The sensors also indicate when the filter 42 needs to be replaced. The drain filter 42 may be a physical filter or alternatively a fluid distillation mechanism (e.g., heating to steam to leave behind contaminants).

Operation of the cleaner 10 is managed by a controller 60 which receives temperature information to determine how to regulate heaters/cooling; controls the locking/unlocking of the hatches; receives fluid cleanliness info to determine whether to divert the same to the system or to the reclamation system; and other functions necessary to the control of the system.

Figure 2:
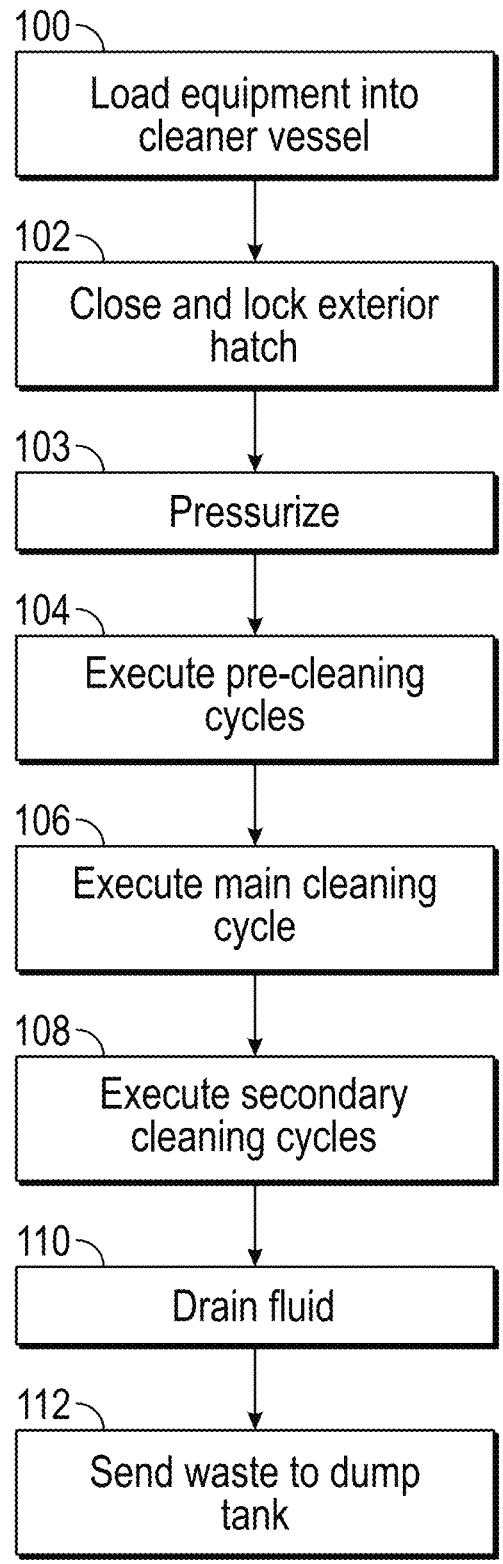
FIG. 2 is an illustration of a method of operating an embodiment of an equipment cleaning system.

Referring to FIG. 2, illustrated is a schematic view of a method of operation of the cleaner 10. At step 100, equipment 14 is loaded into the cleaner vessel 12 via the exterior hatch 16 after depressurization of the cleaner vessel 12. Next, at step 102, the exterior hatch 16 is closed and locked. The interior of the cleaner 10 is pressurized at step 103. One or more pre-cleaning cycles are run at step 104, such as atmosphere blowoff or ionic shower. The main cleaning cycle utilizing fluid 34 is performed at step 106, and secondary cleaning cycles, such as ultrasonic cleaning are performed at step 108. Once the cleaning cycles are completed, the fluid 34 is drained from the cleaner vessel 12 at step 110 and other waste is routed to the dump tank 48 at step 112.

In addition to the cleaning functions described above, the method of operation can be altered to allow the vessel to function solely as a storage location to protect the items within from extra-habitat environmental forces including temperature variations, radiation, etc. In this use case, vessel pressurization, item cleaning, and associated functions to not necessarily occur. Rather the items can be sealed into the protective enclosure and then again retrieved the next time they are required for use. Storage of the tools outside the habitat reduces the amount of dust ingressed. Sensitive tools such as digital cameras may need to be stored and potentially brought into the habitat for hand-cleaning, repair, inspection, data downloads, and more. Cables could be included for charging and/or downloads. Wireless charging hardware could be integrated as well.

The cleaner 10 disclosed herein allows for efficient and effective cleaning of equipment 14 in the extraplanetary environment, and reduces an amount of dust that ingresses into the habitat 24. The cleaning increases the longevity of the equipment 14 and makes the equipment more accessible for inspection and repair in the pressurized environment of the habitat 24.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An equipment cleaning apparatus for an extraplanetary environment comprising:
    an exterior wall of an extraplanetary habitat that separates an interior of the extraplanetary habitat from the extraplanetary environment;
    a cleaner vessel disposed at the exterior wall;
    an exterior hatch located in the exterior wall, and configured to allow for placement of equipment into the cleaner vessel from the extraplanetary environment when the exterior hatch in in an opened position; and
    one or more of one or more spray nozzles and a charged plate disposed inside of the cleaner vessel and configured to perform one or more cleaning operations
    to clean equipment placed in the cleaner vessel.

2. The cleaning apparatus of claim 1, wherein the cleaner vessel is operably connected to a habitat pressurization and depressurization system to selectably pressurize the cleaner vessel;
    wherein the pressurization and depressurization system is configured such that the cleaner vessel is depressurized prior to the exterior hatch being moved to the opened position.

3. The cleaning apparatus of claim 1, further comprising a drain configured to remove fluid utilized in the cleaning vessel from the cleaning vessel to a fluid reclamation system of the extraplanetary habitat.

4. The cleaning apparatus of claim 3, further comprising a filtering mechanism disposed at the drain.

5. The cleaning apparatus of claim 1, further comprising an interior hatch located in the interior of the extraplanetary habitat configured to allow access to the interior of the cleaner vessel from the interior of the extraplanetary habitat.

6. The cleaning apparatus of claim 5, wherein the exterior hatch is configured to be openable only when the interior hatch is closed, and the interior hatch is configured to be openable only when the exterior hatch is closed.

7. The cleaning apparatus of claim 1, wherein the one or more cleaning operations includes one or more of a fluid cleaning cycle, an air cleaning cycle, an ionic shower cleaning cycle, an ultrasonic cleaning cycle, or a centrifugal force cleaning cycle.

8. The cleaning apparatus of claim 1, further comprising a dump tank configured to collect waste from the cleaning vessel.

9. The cleaning apparatus of claim 8, wherein the contents of the dump tank are periodically tested for the presence of volatile materials.

10. The cleaning apparatus of claim 9, wherein upon detection of the presence of volatile materials, the dump tank is emptied outside of the habitat.

11. The cleaning apparatus of claim 1, further comprising one or more charging features disposed in the cleaner vessel configured for charging the equipment placed in the cleaner vessel for cleaning.

* * * * *